Dec. 29, 1931. G. L. HOCKENYOS 1,838,309
GLASS ARTICLE AND METHOD OF TREATING IT
Filed March 13, 1928
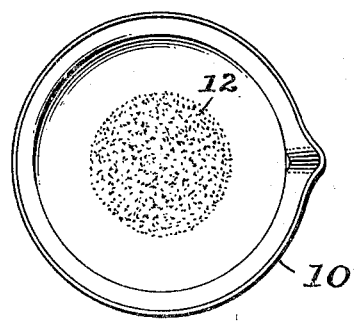
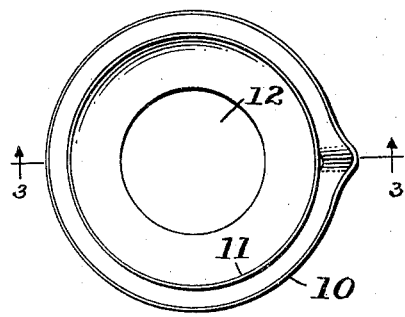
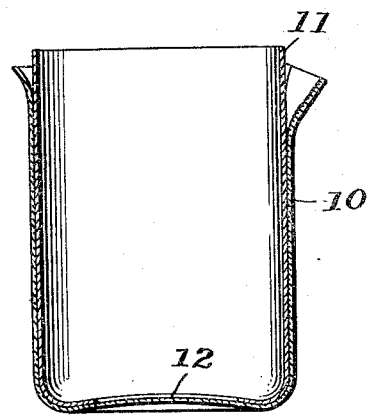
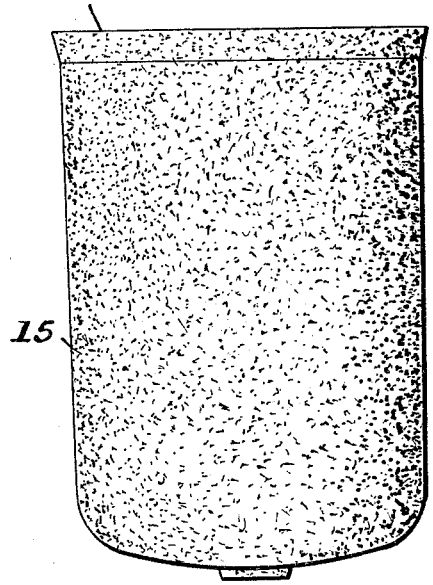
INVENTOR
George L. Hockenyos.
BY
ATTORNEYS.

Patented Dec. 29, 1931

1,838,309

UNITED STATES PATENT OFFICE

GEORGE L. HOCKENYOS, OF URBANA, ILLINOIS, ASSIGNOR TO CORNING GLASS WORKS, OF CORNING, NEW YORK, A CORPORATION OF NEW YORK

GLASS ARTICLE AND METHOD OF TREATING IT

Application filed March 13, 1928. Serial No. 261,400.

This invention relates to glass articles and a method of treating them, it being more particularly directed toward the elimination of "bumping" and the lessening of corrosion.

It has long been customary to produce glass vessels, such as beakers, distillation flasks and coffee urns, with smooth highly polished interior and exterior surfaces. This has been due largely to the ease of production and cleaning as well as to general belief that a smooth polished surface was less subject to corrosion than a roughened one when exposed to chemical reactions.

In boiling liquids in such vessels, however, considerable difficulty has been experienced due to the phenomenon commonly known as "bumping". This is thought to be caused by the efforts of the molecules in heated solutions to separate and appear in the vapor state as bubbles. Due to the resistance the solutions offer to such separation, which causes super-heating, and the absence of nuclei upon which the bubbles can grow, uncontrolled forces are developed which often result in violent explosions and the discharge of the liquid from the vessel. To overcome this, it has been a common practice to introduce a small quantity of glass beads or pieces of platinum into the vessel, but this is cumbersome and unhandy, and is likely to cause contamination of the liquid unless the material introduced is entirely free from dust, dirt and other foreign matter.

I have discovered that "bumping" can be prevented by roughening the interior surface of the vessel in which the boiling is to be conducted, thus avoiding the necessity for using beads or other extraneous materials. Furthermore, contrary to popular opinion, it has been found that roughening increases stability and reduces the corrosive action of aqueous solutions on glass.

It is well known that glass in contact with heated aqueous solutions disintegrates, since the water attacks and dissolves the alkali. This leaves a thin film containing a high percentage of silica adhering to the glass surface and, so long as this film remains in place, it forms a protective coating which checks the attack of the liquid upon the underlying glass body, thus retarding its decomposition. When a smooth glass surface is thus attacked and the alkali dissolved, the silica film is released as there is no irregular surface to hold it in place. This results in the exposure of a fresh area for attack and consequently decomposition is fairly rapid. On the other hand, it has been found that a roughened surface retards disintegration, probably due to the ability of a rough surface to anchor the protective film for a longer period than a smooth surface.

The primary object of this invention is to eliminate the phenomenon commonly known as "bumping" which is frequently experienced when boiling water solution in chemical glassware.

Another object is to increase the stability of glass surfaces and reduce the corrosive action of fluids thereon.

A further object is to produce new and improved glass articles.

The invention embodies among its features the roughening of the surface of glass articles to resist bumping or corrosion.

The above and other objects may be attained by treating glass articles as will be fully set forth in the following specification, pointed out in the appended claims, and illustrated in the accompanying drawings, in which:—

Fig. 1 is a plan view of a beaker which has been treated in accordance with this invention;

Fig. 2 is a view similar to Fig. 1 showing the first step in the method of treatment;

Fig. 3 is a vertical section taken on the line 3—3 of Fig. 2;

Fig. 4 is a side view, on a reduced scale, of an urn liner which has been treated in accordance with this invention.

Referring to the drawings in detail, and Figs. 1—3 in particular, a vessel 10, such as a beaker, is first covered, in the zone where the surface is to remain smooth and intact, with a suitable shield 11, such as a metallic stencil, leaving exposed the parts which are to be roughened. The unshielded portion 12 of the article is then sandblasted to cause it to be pitted, after which the shield is removed and the vessel is ready for use.

As an alternative method the parts of the article that are to be protected may be coated with ceresin wax or the like, after which the exposed portions of the article may be subjected to the sandblasting process. Upon completion of the sandblasting the wax may be melted and poured from the vessel, and all traces of it may be removed with alcohol.

It is to be understood that the entire interior or exterior of vessels may be treated as above described, although I have found that a small sandblasted area on the inside bottom surface of a beaker is sufficient to prevent bumping when aqueous solutions are being boiled.

Where an article is roughened to reduce chemical attack, however, it is desirable to roughen the entire surface which is subjected to such attack, and in Fig. 4 I have illustrated, by way of example, an urn liner 14 such as is commonly employed in coffee urns. Such articles are ordinarily surrounded by a steam jacket and, since steam gradually attacks the glass out of which such liners are made, the entire exterior of the urn liner is preferably sandblasted, as shown at 15. This materially retards the corrosion of the glass.

While in the foregoing I have set forth two preferred embodiments of my invention, it is to be understood that the procedure is susceptible of minor changes, and frosting or etching may be substituted for or used in conjunction with sandblasting, without departing from the scope of the invention as defined in the appended claims.

What is claimed is:

1. A glass vessel in which liquid is heated having a roughened interior surface.

2. A glass vessel in which liquid is heated having a sand blasted interior surface.

3. A beaker for heating liquid having a sand blasted interior surface.

4. The hereinbefore described process of reducing the ebullition of a liquid when heated, which consists in heating the liquid in a glass vessel having a roughened interior surface.

5. The hereinbefore described process of reducing the ebullition of a liquid when heated, which consists in heating the liquid in a glass vessel having a sand blasted interior surface.

GEORGE L. HOCKENYOS.